(12) United States Patent
White et al.

(10) Patent No.: US 12,349,098 B1
(45) Date of Patent: Jul. 1, 2025

(54) TECHNIQUES FOR IDENTIFYING WIRELESS CONNECTIVITY DEADSPOTS IN A GEOFENCED AREA

(71) Applicant: Relay, Inc., Raleigh, NC (US)

(72) Inventors: Kyle White, Fuquay-Varina, NC (US); Ryan McShane, Raleigh, NC (US); Matthew Newton, Park Ridge, IL (US)

(73) Assignee: Relay, Inc., Raleigh, NC (US)

( * ) Notice: Subject to any disclaimer, the term of this patent is extended or adjusted under 35 U.S.C. 154(b) by 0 days.

(21) Appl. No.: 18/768,156

(22) Filed: Jul. 10, 2024

(51) Int. Cl.
 *H04W 64/00* (2009.01)

(52) U.S. Cl.
 CPC ................... *H04W 64/00* (2013.01)

(58) Field of Classification Search
 CPC ... H04W 12/06; H04W 4/021; H04W 12/104; H04W 12/10; H04W 12/63; H04W 4/029; H04W 12/64; H04W 4/33; H04W 4/38; H04W 4/02; H04W 4/06; H04W 4/80; H04W 4/027; H04W 4/24; H04W 4/40; H04W 64/006
 USPC ........ 455/456.1, 41.2, 404.1, 420, 417, 419, 455/457, 432.1
 See application file for complete search history.

(56) References Cited

U.S. PATENT DOCUMENTS

| | | | | |
|---|---|---|---|---|
| 11,416,958 B1 * | 8/2022 | Reichert | ............... | H04W 4/029 |
| 2016/0195602 A1 * | 7/2016 | Meadow | ................... | G01S 5/10 |
| | | | | 701/517 |
| 2017/0213451 A1 * | 7/2017 | Potucek | ................ | F04D 29/708 |
| 2021/0007023 A1 * | 1/2021 | Umapathy | ........ | H04W 36/0061 |
| 2021/0394766 A1 * | 12/2021 | Crawford | ............ | B60W 50/087 |
| 2021/0400767 A1 * | 12/2021 | Zubiaur | ................ | H04W 88/16 |
| 2022/0159432 A1 * | 5/2022 | Crawford | ................ | H04W 4/48 |
| 2022/0197306 A1 * | 6/2022 | Cella | ..................... | B29C 64/386 |
| 2022/0198862 A1 * | 6/2022 | Meadow | .............. | G06Q 20/203 |
| 2023/0214925 A1 * | 7/2023 | Cella | ........................ | G06Q 30/06 |
| | | | | 705/37 |
| 2024/0144141 A1 * | 5/2024 | Cella | .................. | G06Q 30/0206 |

* cited by examiner

*Primary Examiner* — Joseph Arevalo
(74) *Attorney, Agent, or Firm* — Gregory Stephens (57) ABSTRACT

Techniques described herein utilize a system comprised of a cloud-based communication platform server (CPS), a plurality of fixed location wireless beacons within a geofenced area, and a fleet of user equipments (UEs). Each UE is capable of wireless communication with the CPS over one or more of a plurality of wireless RF networks. Additionally, each UE may also be configured to receive RF transmissions directly from the plurality of fixed location wireless beacons. The system may implement a method for determining areas of poor wireless connectivity within the geofenced area. The method may comprise determining whether a UE has an active connection with the CPS via at least one of the plurality of wireless RF networks. When the UE does not have an active connection with the CPS via any of the wireless RF networks, it may self-determine its location within the geofenced area and store its self-determined location. The UE may repeat the location self-determining and location storing steps on a periodic basis until the UE has re-established an active connection with the CPS. Once the UE has re-connected to the CPS, it may then upload the set of stored self-determined location data to the CPS that was acquired while the UE was disconnected from the CPS.

24 Claims, 5 Drawing Sheets

TECHNIQUES FOR IDENTIFYING WIRELESS CONNECTIVITY DEADSPOTS IN A GEOFENCED AREA

The present disclosure generally relates to electronic communication systems and, more particularly, to determining the position of a device within indoor environments.

BACKGROUND

Portable communication devices often incorporate location determination systems like the Global Positioning System (GPS). While these systems can be effective, they may face specific challenges in accurately determining positions under certain conditions. For example, their accuracy often declines in indoor settings or amidst adverse atmospheric conditions. Even in instances where conventional systems offer relatively accurate latitude and longitude coordinates, they may struggle with precise elevation identification. This issue becomes particularly pronounced in complex environments, such as multi-story and high-rise buildings, where determining an exact elevation, such as a particular floor, of a device may be important yet often falls short of the needed accuracy. The accurate position data may further be used to identify areas of poor wireless connectivity which may lead to additional equipment being deployed to enhance the wireless connectivity in such identified areas.

SUMMARY

Embodiments described herein include a system comprised of a cloud-based communication platform server (CPS), a plurality of fixed location wireless beacons within a geofenced area, and a fleet of user equipments (UEs). Each UE is capable of wireless communication with the CPS over one or more of a plurality of wireless RF networks. Additionally, each UE may also be configured to receive RF transmissions directly from the plurality of fixed location wireless beacons. Each UE further includes a global positioning system (GPS) module allowing the UE to locate itself separately from the fixed location wireless beacons.

In such a system, there may be a method for determining areas of poor wireless connectivity within the geofenced area. The method may comprise, for each UE in use within the geofenced area, determining whether the UE has an active connection with the CPS via at least one of the plurality of wireless RF networks. When the UE does not have an active connection with the CPS via any of the wireless RF networks, it may take several steps. First, the disconnected UE may self-determine its location within the geofenced area and store its self-determined location. The UE may repeat the location self-determining and location storing steps on a periodic basis until the UE has re-established an active connection with the CPS. Once the UE has re-connected to the CPS, it may then upload the set of stored self-determined location data to the CPS that was acquired while the UE was disconnected from the CPS.

In one embodiment, environmental layout data for the plurality of wireless beacons may be stored on each UE. The environmental layout data comprises information that uniquely identifies each wireless beacon and associates each wireless beacon with its location within the geofenced area.

In one embodiment, self-determining the location of the UE comprises inputting the plurality of wireless beacon RF transmission signal strengths into a computational model that analyzes factors to probabilistically determine a nearest wireless beacon to the UE. The output of the computational model may be an indication of an identity of the nearest wireless beacon or a respective location of the nearest wireless beacon.

In one embodiment, the factors comprise the environmental layout data and signal strength data corresponding to the plurality of wireless beacon RF transmissions.

In one embodiment, the computational model may be a Hidden Markov Model (HMM).

In one embodiment, the wireless beacons may employ Bluetooth Low Energy (BLE) technology for signal transmission.

In one embodiment, the CPS may analyze the uploaded stored self-determined location data from each UE to determine areas within the geofenced area that exhibit poor wireless connectivity.

In one embodiment, the periodic basis is every ten seconds.

Some embodiments of the present disclosure relate to computer system that cause a processor of a first user equipment (UE), perform the method(s) described.

Some embodiments of the present disclosure relate to a non-transitory computer-readable medium storing instructions that, when executed by a processor of a first user equipment (UE), perform the method(s) described.

BRIEF DESCRIPTION OF THE DRAWINGS

Throughout the drawings, reference numbers can be re-used to indicate correspondence between referenced elements. The drawings are provided to illustrate embodiments of the present disclosure and do not to limit the scope thereof.

DETAILED DESCRIPTION

Location tracking technologies play an important role in numerous applications by enhancing the interaction between mobile devices and their environments. Traditionally, location determination largely depends on Global Positioning Systems (GPS). However, GPS technologies often fall short in indoor environments where signal obstruction leads to significant inaccuracies, thereby impairing the user experience. This limitation underscores the need for more effective location tracking methods that can provide precise location data both indoors and in mixed settings.

The inventive concepts described herein improve a location determination process by enabling a user equipment (UE) to independently process and determine its own location within a designated coverage area. For example, the UE can obtain signals from wireless communication nodes deployed throughout the designated coverage, and can determine its location based on these signals. The UE can then selectively communicate its location to a communication platform server (CPS), such as when a change in location is detected. In this way, the CPS can maintain an accurate record of the UE's location without the need for interval-based transmission of location data from the UE. By allowing the UE 110 to handle its own location determination and convey the location information only when certain conditions are met, the inventive concepts advantageously decrease the frequency of communications by the UE, thereby conserving battery life of the UE and reducing overall data consumption.

Accordingly, the inventive concepts described herein represent a notable improvement in the field of telecommunications, particularly in enhancing the accuracy and efficiency of location tracking technologies. By enabling a UE to autonomously determine its location using environmental layout data and/or signals from wireless communication nodes, these inventive concepts refine the approach to location-based services. The disclosed techniques allow mobile devices to efficiently manage their energy and bandwidth resources while providing reliable location tracking, thus improving the practical application of these technologies in various environments.

System Overview

Figure 1:
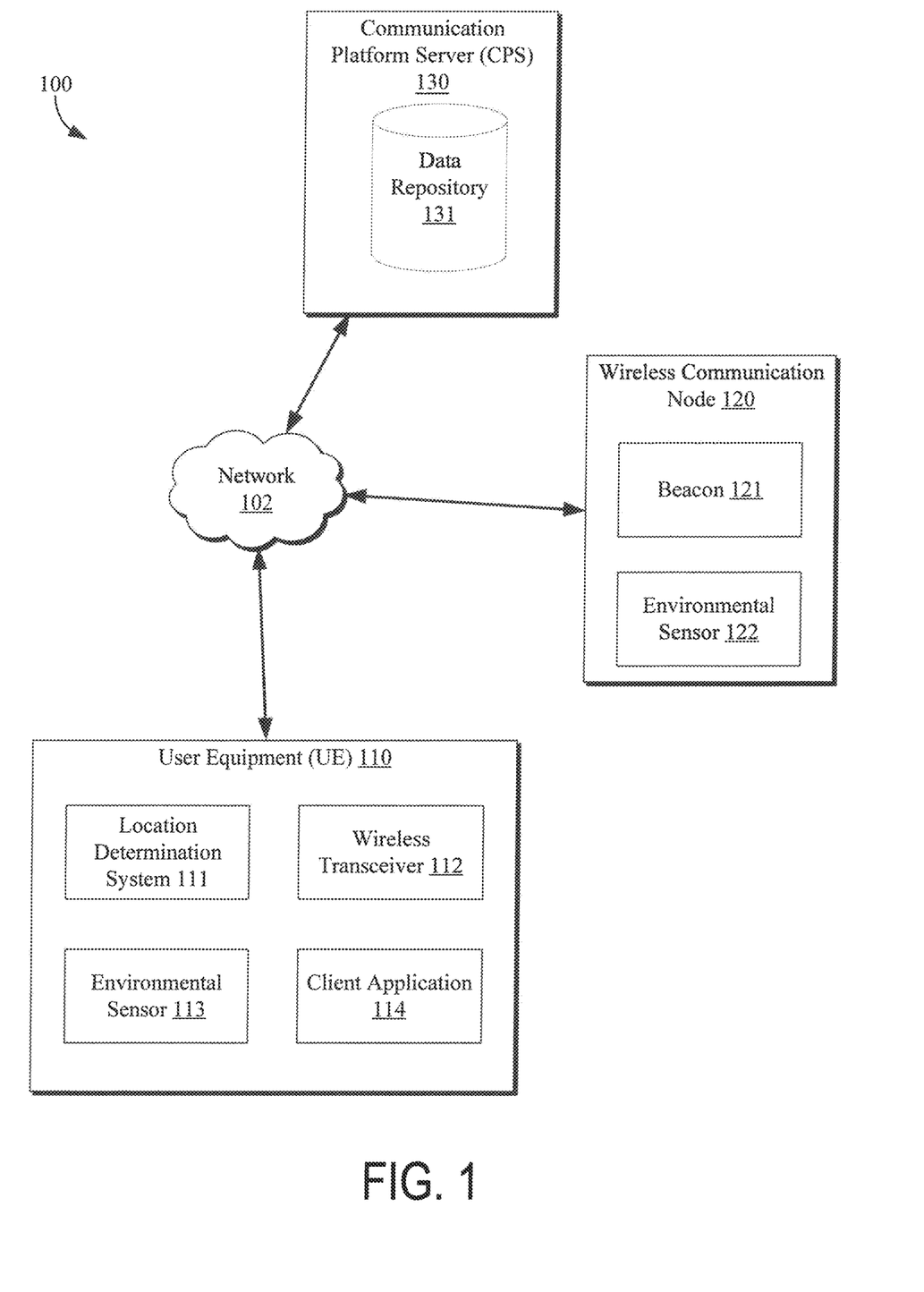
FIG. 1 illustrates a block diagram of a location determination system for determining the location of a user equipment (UE) within a designated coverage area.

FIG. 1 illustrates a block diagram of a location determination system 100 for determining a location of a user equipment (UE) 110 within a designated coverage area. The location determination system 100 includes the UE 110, a wireless communication node 120, and a communication platform server (CPS) 130. To simplify discussion and not to limit the present disclosure, FIG. 1 illustrates only one UE 110 and wireless communication node 120, though multiple may be used. For example, a collection of wireless communication nodes 120 can be deployed throughout an area to facilitate location determination of any number of UE 110 in the designated coverage area.

Any of the foregoing components or systems of the location determination system 100 may communicate via the network 102. Although only one network 102 is illustrated, multiple distinct and/or distributed networks 102 may exist. The network 102 can include any type of communication network, including RF (Radio Frequency) communication. For example, the network 102 can include, but is not limited to, local area networks (LAN), wide area networks (WAN), cellular networks such as 4G LTE, 5G, HSPA, and 3G, Bluetooth and Bluetooth Low Energy (BLE) protocols, ad hoc networks, satellite networks, wired networks, or wireless networks, such as Internet Protocol (IP) networks. In some embodiments, the network 102 can include the Internet.

Any of the foregoing components or systems of the location determination system 100, such as any one or any combination of the UE 110, the wireless communication node 120, or the CPS 130 may be implemented using individual computing devices, processors, distributed processing systems, servers, isolated execution environments (e.g., virtual machines, containers, etc.), shared computing resources, or so on. Furthermore, any of the foregoing components or systems of the location determination system 100 may be combined and/or may include software, firmware, hardware, or any combination(s) of software, firmware, or hardware suitable for the purposes described.

The UE 110 can be a portable, handheld tool. For example, the UE 110 can include, but is not limited to, a smartphone, tablet computer, handheld computer, laptop computer, desktop computer, wearable device, server, portable media player, gaming device, or the like. In some cases, the UE 110 is a dedicated team coordination device. For example, the UE 110 can facilitate team coordination through features such as, but not limited to, two-way radio capabilities, location tracking, messaging, or voice commands. An example UE 110 is the RelayX™ by Relay, Inc. in Raleigh, NC.

The UE 110 can be compatible with a client application 114, which may include, but is not limited to, a web browser, a mobile application or "app," a background process that performs various operations with or without direct interaction from a user, or a "plug-in" or "extension" to another application, such as a web browser plug-in or extension. The UE 110 can include a processor configured to execute instructions. The client application 114 can facilitate various communication functions such as real-time messaging, sending alerts, or tracking locations of UE 110 within the network 102. In some cases, the client application 114 can allow administrators or help desk personnel to communicate directly with the UE 110, such as by sending instructions or alerts, or monitoring activities.

The UE 110 can include a location determination system 110 for determining the location of the UE 110. The location determination system 110 can determine the location of the UE 110 based at least in part on receiving and/or analyzing broadcasts from nearby wireless communication devices 120 (e.g., beacons 121) in known fixed locations. As described herein, the beacons 121 can emit RF signals using technologies like Bluetooth Low Energy (BLE). Upon receiving these signals, the UE 110 can analyze signal characteristics. By processing these signals, the UE 110 can perform triangulation or other proximity analysis to estimate its approximate location within the designated coverage area. This analysis can facilitate an accurate determination of the relative or absolute position of the UE 110 with the designated coverage area. When put into context with the knowledge of the fixed location(s) of the beacons 121, the UE 110 can accurately locate itself using environmental layout data of the designated coverage area.

The location determination may be performed by the UE 110 itself, rather than the CPS 130, and the UE 110 can communicate updates to the CPS 130 with its location. Since communicating location updates involves activating a wireless transceiver 112, which consumes power, it can be battery intensive. Additionally, frequent data transmissions utilize bandwidth and increase data usage. By conducting the analysis internally on the UE 110, the UE 110 conserves battery life and reduces data usage by limiting communication with the CPS 130 to updates only. This approach decreases the frequency of communications by the UE 110, thereby conserving battery life and reducing overall data consumption.

In some cases, the UE 110 can include an environmental sensor 113, for example to measure any of various parameters including, but not limited to, barometric pressure, temperature, humidity, light, sound levels, air quality, or electromagnetic field (EMF) strength. In some such cases, the UE 110 can determine or confirm a location determination by utilizing environmental data from its own environmental sensor 113 and the environmental sensor 122 from a wireless communication node 120. By analyzing environmental parameters, the UE can detect patterns and variations characteristic of specific geographical locations or environmental conditions. For example, the UE 110 might identify a particular set of environmental conditions that align with those currently recorded near the wireless communication node 120, supporting the location determined through signal analysis. If the UE 110 estimates that it is closest to a first wireless communication node, the UE 110 can compare the data from an environmental sensor of that first wireless communication node with its own environmental sensor data. If the environmental conditions, such as humidity or barometric pressure, are similar or within a certain threshold, this similarity can confirm the accuracy of the initial location analysis. Conversely, if the environmental data from the UE 110 and the first wireless communication node do not match or satisfy a threshold, the UE 110 can assume that the initial analysis may be incorrect and revise the estimate or consider additional factors to improve the accuracy of the location determination. In some cases, machine learning algorithms can enhance this process by correlating historical and real-time environmental data, allowing the UE 110 to refine its location estimation further.

The UE 110 can include a wireless transceiver 112 that enables it to send and receive information, such as to or from the CPS 130. For example, the UE 110 can send location information to the CPS 130, a process that may vary in frequency based on the dynamics of the environment and its movement. Frequent communication can be power-intensive as it may require the wireless transceiver 112 to be active, thereby consuming significant battery life and bandwidth. However, to reduce battery usage and reduce data consumption, the UE 110 can be configured to send updates according to a predetermined schedule, policy, or algorithm, or only under specific conditions. For example, a frequency-based schedule may dictate that UE 110 signals are communicated at specific intervals, such as such as every X seconds or minutes. As another example, the UE 110 may send location information when certain conditions are satisfied, such as when the UE's location changes by a threshold amount or deviates from an expected location by a threshold amount.

In some cases, the UE 110 can receive environmental layout data via the wireless transceiver 112. For example, the UE 110 may receive environmental layout data from the CPS 130, from a wireless communication node 120, or have it preprogrammed. The environmental layout data can vary across embodiments. In some cases, the environmental layout data includes information that uniquely identifies each wireless communication node 120 and associates each wireless communication node 120 with a distinct location within a designated coverage area. For example, in a situation where the wireless communication nodes 120 are distributed across multiple floors within the multi-story building, the environmental layout data can include indications of a respective floor and area for each wireless communication node 120.

As mentioned, the location determination system 100 can include a collection of wireless communication nodes 120 deployed throughout a designated coverage area. A designated coverage area may include various static or dynamic environments, including, but not limited to, retail environments, hospitality venues, corporate offices, educational institutions, single or multi-story buildings, distinct rooms or floors, and indoor or outdoor settings, including mixed indoor and outdoor environments like campuses, hotels, or commercial centers. In some cases, a designated coverage area can range from a few hundred square feet (e.g., a small retail store) to several acres (e.g., a large hotel complex). In some cases, a designated coverage area can include a multi-story office building with thousands of square feet per floor, or an expansive university campus with numerous buildings and outdoor spaces.

Deployment of wireless communication nodes 120 within a designated coverage area can be guided by specific strategies tailored to the environment's characteristics and intended use. For example, a deployment strategy can include placing the wireless communication nodes 120 such that every point on a predetermined horizontal plane, such as ground level or eye level, within each location of the designated coverage area receives signals from at least one, two, or more wireless communication nodes 120. In more complex configurations, a deployment strategy ensures coverage throughout an entire three-dimensional space of the designated coverage area, covering both horizontal and vertical dimensions. In some such configurations, each vertical and horizontal location of the designated coverage area receives signals from at least one, two, or more wireless communication nodes 120. In some cases, a deployment strategy can include deploying nodes at strategic points, such as near staircases, elevators, or in common areas, to improve signal reach and effectiveness based on architectural layouts and expected user movement patterns.

The quantity of wireless communication nodes 120 within a designated coverage area can be scaled, for example, according to the complexity and size of the designated coverage area or the specific demands of the location determination system 100. For example, in smaller, confined spaces such as single-floor retail stores, a few wireless communication nodes 120 (e.g., one or two for each room) may provide adequate coverage and accuracy. Conversely, for larger, more complex environments like hotels, multi-story office buildings or sprawling university campuses, the number of nodes can be significantly higher, potentially extending into the hundreds or thousands. In such cases, the strategic distribution of these wireless communication nodes 120 takes into account not only the vastness of the designated coverage area but also the architectural nuances that might affect signal transmission, such as walls, floors, or large obstacles.

Each wireless communication node 120 can include one or more components to support accurate location determination of a UE 110. These components can include, but are not limited to, a beacon 121 or an environmental sensor 122.

A beacon 121 can be configured to emit radio frequency (RF) signals, for example, using Bluetooth Low Energy (BLE) technology. In some cases, this emission enables the determination of the approximate location of the UE 110 within the designated coverage area by analyzing signals from this beacon 121 and/or other beacons 121 within the vicinity. For example, the beacon(s) 121 can broadcast signals that, when received by the UE 110, facilitate a triangulation process or proximity analysis, thereby facilitating the determination, by the UE 110 or by the CPS 130, of the relative location of the UE 110 within the designated coverage area covered by the beacon network. For example, by analyzing the strength (e.g., Received Signal Strength Indicator (RSSI)), direction (e.g., with technologies like Bluetooth 5.1's direction finding feature), time of flight, phase difference, or other signal characteristics of these signals from one or multiple beacons 121, the location of a particular UE 110 can be estimated relative to the beacons 121. Moreover, the beacons 121 are deployed in known fixed locations which allows a UE 110 to determine its location using its proximity to the beacons.

Although described generally as Bluetooth technology, alternative wireless technologies may also be utilized. Examples include wireless mesh devices operating under standards such as 802.15.4, and Internet-of-Things (IoT) devices. These devices can emit signals across multiple frequency ranges or utilize various wireless protocols, enhancing the network's ability to maintain robust and scalable communications within the designated coverage area.

In some cases, a beacon 121 can be configured to emit RF transmissions at multiple distinct power levels. For example, a beacon 121 can emit first RF transmissions at a first power level (e.g., −30 dBm) and second RF transmissions at a second power level (e.g., 0 dBm). In addition or alternative, a beacon 121 can be configured to emit RF transmissions at multiple frequencies. For example, in some cases, a beacon 121 can emit first RF transmissions at a first frequency (e.g., 2.4 GHz) and a second RF transmissions at a second frequency (e.g., 5 GHz). Emitting at multiple power levels and/or multiple frequencies can facilitate an improved analysis of signal characteristics, which can vary depending on the power level and/or frequency of the transmission. Variations in power levels and/or frequencies can affect the range and penetration of the RF signals. For example, higher power levels may penetrate walls or other objects more effectively than lower power levels. Lower power levels can be better suited for reducing interference and improving signal precision in densely populated areas or environments with many obstacles. Additionally, using multiple frequencies can help mitigate issues such as signal fading and multipath interference, providing a more reliable and accurate signal analysis. This variation introduces by emitting RF signals at multiple power levels or frequencies can provide more comprehensive data on signal attenuation, reflection, and/or interference, enhancing the accuracy of location determination and environmental mapping by allowing the UE 110 to better analyze signal behavior under different conditions. Furthermore, emit RF transmissions at multiple distinct power levels can provide redundancy, improving reliability of signal reception under varying conditions.

In some cases, the beacons 121 can transmit RF signals at intervals determined by predefined criteria. These beacon 121 RF transmissions, sometimes called "pulses", can be scheduled to occur at regular intervals, such as every X seconds or minutes, based on a predetermined schedule, policy, or algorithm. For instance, a frequency-based schedule may dictate that beacon signals are broadcasted at specific intervals to optimize detection and communication with the UE 110. In situations where the UE 110 does not receive an RF transmission of a beacon 121, the UE 110 can infer that it may not be in close proximity to that beacon 121. This lack of signal reception can enable the UE 110 to adjust its location estimation processes or analyze signals from alternative beacons 121 to refine its position within the designated coverage area. Such a mechanism can allow the UE 110 to continually update its location information based on the availability and strength of received beacon signals.

An environmental sensor 122 can measure any of various parameters including, but not limited to, barometric pressure, temperature, humidity, light, sound levels, air quality, or electromagnetic field (EMF) strength. The environmental sensor 122 can include, but is not limited to, a barometric pressure sensor, a temperature sensor, a humidity sensor, a photodetector or light sensor, a sound or noise level meter, an air quality sensor, or an EMF meter. In some cases, in addition to the wireless communication node 120 including an environmental sensor 122, the UE 110 can also include an environmental sensor 122. In some such cases, the environmental sensor 122 of the UE 110 can be the same or similar to that of the environmental sensor 122 of the wireless communication node 120. In this way, the UE 110 can compare its environmental data with that of the wireless communication node 120, providing a factor to confirm or determine the location of the UE 110. In some cases, by comparing environmental conditions, the UE can verify and refine its proximity estimation.

In some cases, the environmental sensor 122 can include or more sensors configured to detect changes within their immediate surroundings, such as movement or the proximity of an object or individual. Such environmental sensors can include, but are not limited to, proximity or motion sensors. When these sensors detect changes, they generate data that can indicate the presence of an individual (potentially the user of the UE 110) within a specific proximity to the corresponding wireless communication node 120. Although possibly not conclusively verifying the specific location of the UE 110, this data can contribute an additional layer of information for location analysis. For example, it can be factored into the broader process of location determination, offering another dimension of evidence that supports the inference of the proximity of the UE 110 to a specific wireless communication node 120. This multi-faceted approach to gathering and analyzing data can serve to refine the overall capacity of the UE 110 for providing accurate location determinations.

In some instances, the beacon RF transmissions can include data indicative of environmental conditions, sourced from environmental sensor 122. By incorporating environmental sensor data into these RF transmissions, the beacon 121 can allow the UE 110 to gain insights into the surrounding environmental conditions. In some instances, environmental sensor data can be transmitted via signals other than RF transmissions.

The CPS 130 can manage and facilitate data exchanges between the UE(s) 110, the wireless communication node(s) 120, and/or itself. The CPS 130 can process and store location data, enabling real-time or near real-time location services through its interfaces with UEs and wireless communication nodes across multiple network protocols, ensuring efficient data transfer necessary for accurate location determination.

The CPS 130 can communicate bidirectionally with UEs to receive and/or transmit location data, allowing it to maintain and update a dynamic map indicative of UE positions within the designated coverage area. The CPS 130 can generate and update environmental layout data, which includes detailed mappings of wireless communication node 120 deployments and their associated identity and location data within the designated coverage area.

The CPS 130 can support the operation of a Dashboard, an administrative tool used to manage and configure communication devices and user settings. This Dashboard can provide functionalities for visualizing real-time location data, monitoring user activity, and managing alerts. It can allow administrators to deploy and manage communication networks, ensuring device functionality and effective coordination of team members.

The CPS 130 can facilitate the functionality of an app, such as the client application 114. In some such cases, the client application 114 can be implemented as a smartphone application designed for managers to oversee team communications. This client application 114 can support real-time messaging, alert sending, and location tracking of team members. The client application 114 can allow managers to communicate directly with their team, send instructions, and monitor activities.

The CPS 130 can include a data repository 131 for storing environmental layout data and/or location data relevant to UEs 110 of one or more designated coverage areas. For example, the data repository 131 can maintain mappings that include unique identifiers and precise location data for each wireless communication node 120.

Figure 2:
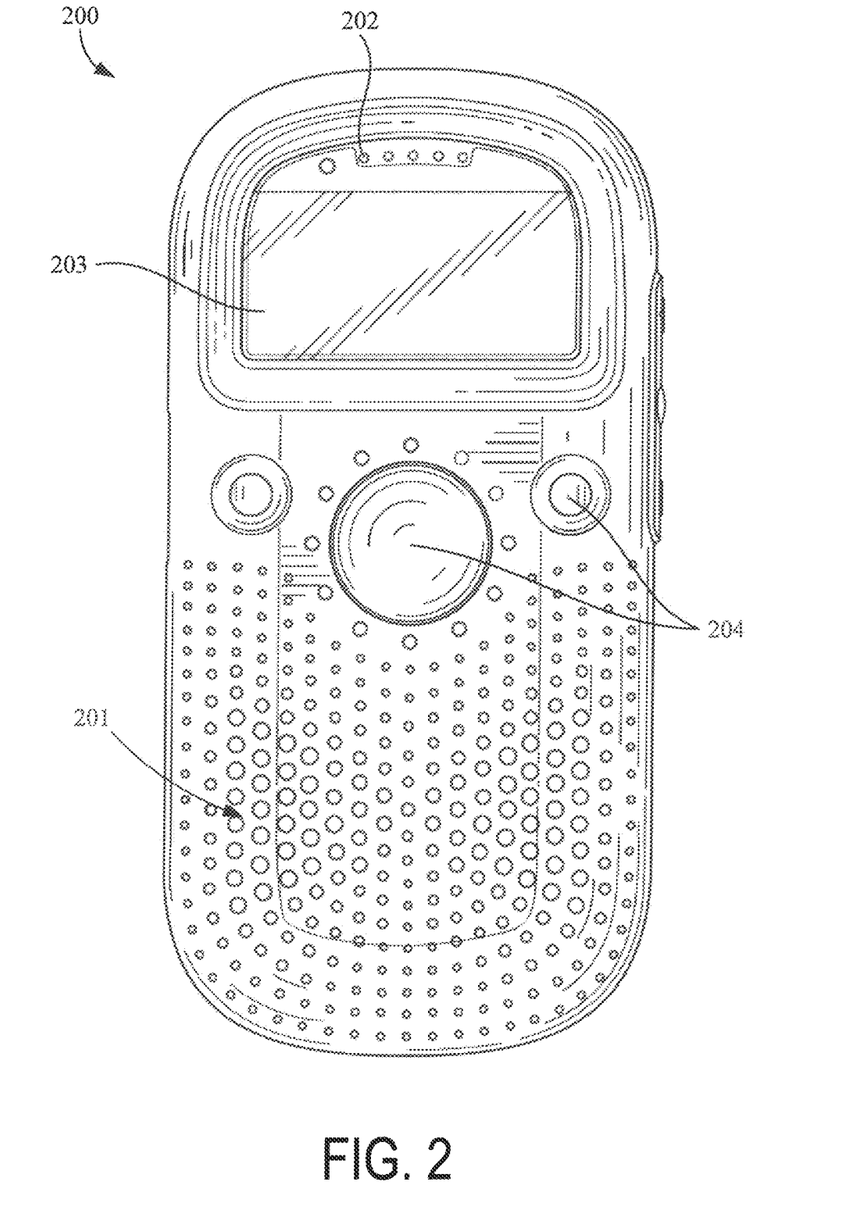
FIG. 2 depicts an example of UE, according to some embodiments of the inventive concepts.

FIG. 2 depicts an example of UE 200, according to some embodiments of the inventive concepts. It will be appreciated that the UE 200 may be an embodiment of the UE 110 of FIG. 1. As described herein, the UE 110 can be configured to support communication and operational functionalities across diverse industries. For example, the UE 200 can facilitate two-way communication, location tracking, and/or real-time data exchange.

The UE 210 can be designed with a compact and durable form factor, suitable for use in environments that demand robust handling and frequent use. The UE 200 can include a speaker 201, microphone 202, a display screen 203, a device interface (not shown) for coupling with external accessories such as, for instance, a headset, and a user interface that may include buttons 204 and/or a touchscreen component of the display screen 203.

Consider a scenario in a hotel environment where a collection of UE 200 devices is deployed and distributed among the housekeeping staff. Each housekeeper can be assigned specific hotel rooms as part of their daily cleaning rounds. The individual UE 200 devices enable housekeepers to communicate with each other, allowing them to coordinate tasks efficiently, request supplies, or call for assistance when needed. Furthermore, the location of each UE 200 can be tracked or determined for indoor room-level positioning. In this way, hotel management can monitor the locations of staff via the client application 114 or a Dashboard, ensuring that all assigned rooms are being attended to promptly. Hotel management can also use this data to analyze the time each staff member spends in each room, helping to identify any inefficiencies or deviations from expected cleaning times. In this way, the location determination system 100 can improve operational efficiency by ensuring staff accountability and helping management meet guest expectations for room readiness and cleanliness.

Figure 3:
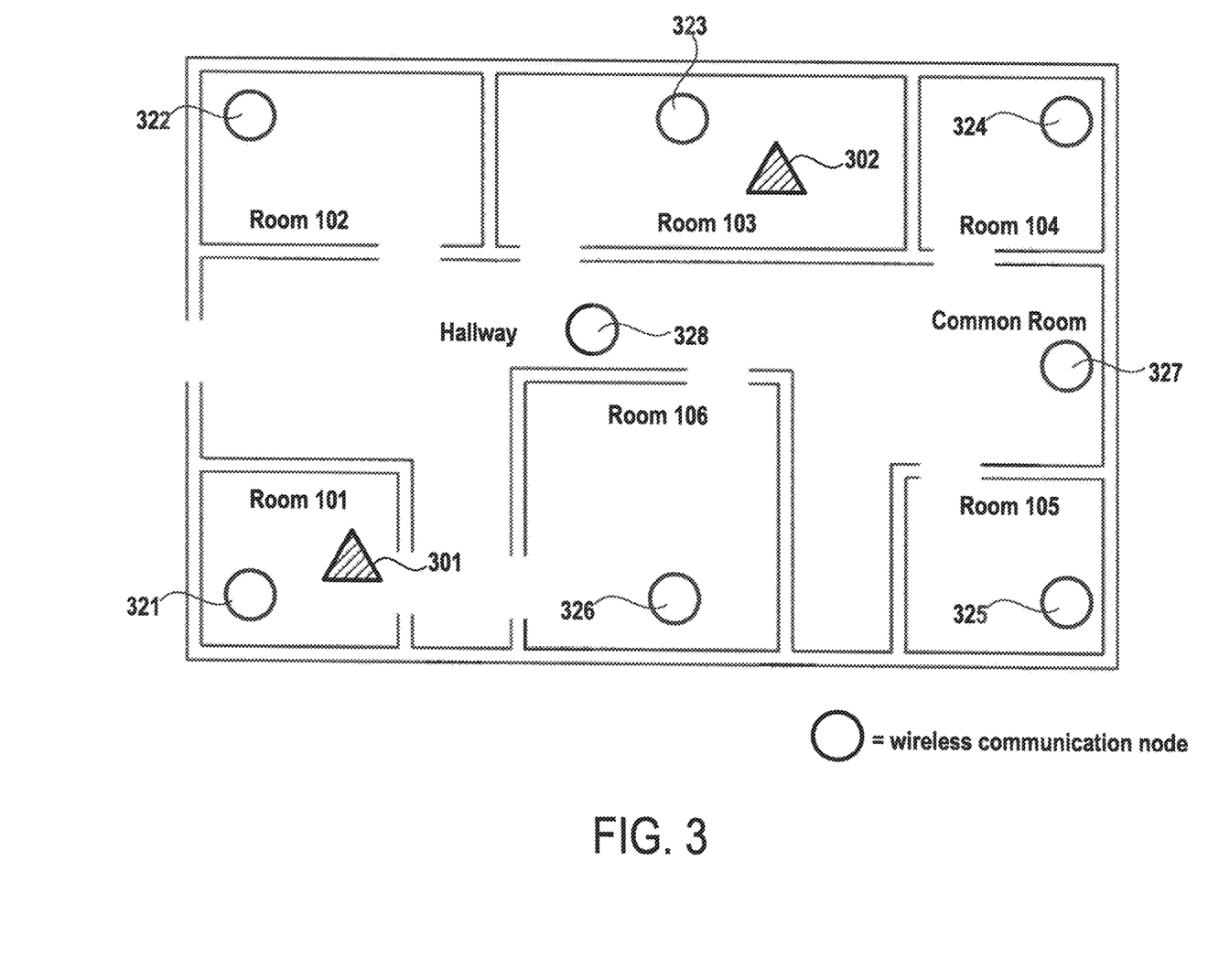
FIG. 3 illustrates an example floor plan displaying example placement of wireless communication nodes within a first-floor building layout.

FIG. 3 illustrates a floor plan displaying example placement of wireless communication nodes 321, 322, 323, 324, 325, 326, 327 within a first-floor building layout. The wireless communication nodes, indicated by circles, are distributed across various rooms and common areas to improve location determination capabilities of the UEs 301 and 302. In this example, Rooms 101, 102, 103, 104, 105, and 106, as well as the common room 107 and hallway 108, are each equipped with one wireless communication node. Though each room is depicted as having one corresponding wireless communication node, it will be appreciated that, in some cases, a room may have no wireless communication nodes, or may have more than one. In some cases, the wireless communication nodes are distributed throughout the floor layout such that each location of the designated coverage area (i.e., the floor plan) receives signals from at least two wireless communication nodes 120.

A non-limiting example of a data structure for storing environmental layout data for wireless communication nodes within the first floor of the building is illustrated in Table 1. Each entry in the table specifies the Node ID, Room Number, and the Coordinates (X, Y) of each node, along with a descriptive text about its placement. In this example, the coordinates represent a wireless communication node's location within the room, measured in meters from a defined origin point, typically the entrance or a corner of the room. In some cases, such a coordinate system can allow a UE to accurately triangulate its position relative to these fixed nodes, thereby achieving precise indoor localization. The Description column offers additional insights into each node's strategic placement, aiding in understanding the wireless communication node's function and its impact on network coverage and signal strength within the specified areas. It will be appreciated that the data structure can vary across environments and may include fewer or different pieces of information depending on specific operational requirements or configurations.

TABLE 1

Environmental Layout Data for Wireless Communication Nodes

| Node ID | Room Number | Coordinates (X, Y) | Description |
| --- | --- | --- | --- |
| 321 | 102 | (5, 5) | Near the entrance |
| 322 | 103 | (3, 10) | Center of the room |
| 323 | 103 | (10, 15) | Next to the window |
| 324 | 104 | (2, 8) | Adjacent to the door |
| 325 | 105 | (6, 18) | Near the rear wall |
| 326 | 106 | (12, 3) | Beside the workstation |
| 327 | Common Room | (9, 22) | Center of the room |
| 328 | Hallway | (15, 10) | Near the intersection |

As a non-limiting example, UE 301 can communicate with some of the wireless communication nodes to determine that it is in Room 101. For example, in some cases, the UE 301 may only communicate with the nearest wireless communication nodes, which in this case could include wireless communication nodes 321 in Room 102 and possibly node 326 in Room 106, depending on the specific range and configuration of the wireless communication node. The UE 301 can use signals from these wireless communication nodes 321, 326 to determine its position within Room 102 accurately. Similarly, UE 302 can communicate with some of the wireless communication nodes to determine that it is in Room 103.

Location Tracking in the User Equipment

Individuals in various settings can carry user equipment (UE), which enables the tracking of their locations. This capability is beneficial for multiple applications, including security and operational management. Conventionally, location determination tasks are centralized, managed at the server level by the CPS 130. In such a setup, a collection of wireless communication nodes 120 is deployed across a designated coverage area, and a UE 110 periodically collects data from these beacons. This information is transmitted to the CPS 130 at regular intervals, such as every 60 seconds, and the CPS 130 then determines the position of the UE 110 based on the received data. However, frequent transmission to the CPS 130 by the UE leads to substantial battery consumption and significant bandwidth usage due to the regular activation of the UE's wireless transceiver 112.

Some inventive concepts described herein relate to shifting the responsibility for location determination tasks from the CPS 130 to the UE 110. This shift allows the UE 110 to independently process and determine its own location within its environment, rather than relying on the CPS 130. The UE 110 obtains environmental layout data, which includes the identities and locations of wireless communication nodes 120. The UE 110 then scans for signals from these wireless communication nodes to accurately determine its location. Although the CPS 130 may still monitor the locations of the UEs 110 for overall system awareness, this approach can significantly reduce the frequency of communications between the UE 110 and the CPS 130. For instance, the UE 110 may only send updates to the CPS 130 when its location changes by a specified threshold amount or deviates from an expected path or timeline by a similar margin. By transferring the location determination responsibilities to the UE 110 and decreasing the frequency of updates it sends to the CPS 130, these inventive concepts advantageously improve energy consumption and bandwidth usage.

Practical applications of these concepts are particularly valuable in various settings, such as in the hospitality industry, where precise location tracking can significantly enhance operational efficiency. For example, in a hotel environment, a collection of UE 110 devices can be distributed among housekeeping staff to facilitate effective monitoring of staff movements. Using techniques described herein, each UE 110 can track a housekeeper's indoor room-level positioning, ensuring they attend to their assigned rooms and adhere to their cleaning schedules. By enabling UEs to independently handle their location updates, frequent data exchanges over networks are reduced, which improves resource utilization and reduces operational costs.

Figure 4:
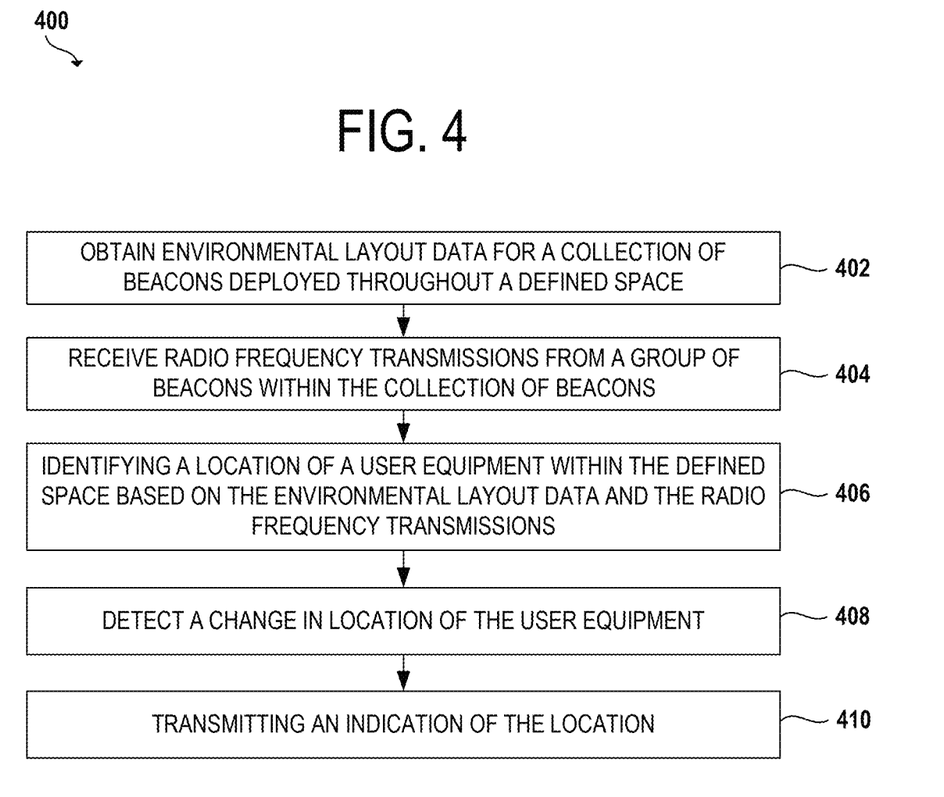
FIG. 4 presents a flow diagram illustrating an embodiment of routine, implemented by a UE, located within a designated coverage area.

FIG. 4 presents a flow diagram illustrating an embodiment of routine 400, implemented by a UE 110, within a designated coverage area. The diagram outlines the process by which the UE 110 determines its own location by interacting with collection of wireless communication nodes 120 deployed throughout the designated coverage area. Although described as being implemented by the UE 110, it will be understood that one or more elements outlined for routine 400 can be implemented by one or more computing devices/components that are associated with the location determination system 100, such as the CPS 130 or other network systems involved in managing and distributing environmental layout data. Thus, the following illustrative embodiment should not be construed as limiting.

At block 402, the UE 110 obtains or stores environmental layout data for collection of wireless communication nodes 120 deployed throughout the designated coverage area. As described herein, the designated coverage area can be a predefined spatial region such as, but not limited to, one or more floors of single or multi-floor build, like a hotel, hospital, retail store, or complex. As described herein, in some cases, the wireless communication nodes 120 can be strategically deployed throughout the designated coverage area to ensure that, as the UE 110 moves around the designated coverage area, the UE 110 remains within the range of the signals from at least one wireless communication node 120 at all times. In some cases, the wireless communication nodes 120 may be deployed such that the UE 110 remains within the range of the signals from at least two or at least three wireless communication nodes 120 at all times.

As described herein, environmental layout data can include information about locations, identifiers, and/or coverage areas of wireless communication nodes 120 within the designated coverage area. The UE 110 may obtain the environmental layout data from different sources, depending on the embodiment. In some cases, the UE 110 receives this environmental layout data from the CPS 130. For example, the CPS 130 can supply the environmental layout data when the UE 110 first enters the designated coverage area or as needed if the UE 110 requests updates to accommodate changes like additional nodes or adjusted node configurations. In some cases, the UE 110 may receive or obtain the environmental layout data directly from one or more of the wireless communication nodes 120 themselves. For instance, the wireless communication nodes 120 might include the environmental layout data as part of their regular signal broadcasts, enabling the UE 110 to update its information dynamically as it moves within the designated coverage area. In some cases, the environmental layout data can be downloaded from a database, such as one maintained by the CPS 130, or the environmental layout data may be preprogrammed into the UE 110 prior to deployment.

At block 404, the UE 110 receives radio frequency (RF) transmissions from a group of wireless communication nodes 120 within the collection. As described, depending on its location within the designated coverage area, the UE 110 may only receive transmissions from a subset of the wireless communication nodes at any given time. For example, some RF transmissions by some wireless communication nodes 120 may not reach the UE 110 due to distance limitations or physical obstructions such as walls or other barriers. This variability in signal reception can be important to mapping the UE's movement and/or determining the location of the UE 110 relative to the wireless communication nodes 120.

In some cases, each wireless communication node 120 can be configured to emit RF transmissions at only one distinct power level, or at only one frequency. However, in other scenarios, each wireless communication node 120 can be configured to emit RF transmissions at multiple distinct power levels or at multiple distinct frequencies.

In some cases, the RF transmissions include environmental sensor data associated with respective wireless communication nodes 120. For example, a wireless communication node 120 may include an environmental sensor 122. In some such cases, the environmental sensor 122 can include, but is not limited to, a barometric pressure sensor, a temperature sensor, a humidity sensor, a light sensor, a proximity sensor, a motion sensor, or the like.

At block 406, the UE 110 identifies its location within the designated coverage area based on the RF transmissions received from the wireless communication nodes 120. Identifying the location can include assessing one or more signal characteristics of the RF transmission signals. The one or more signal characteristics can include, but are not limited to, signal strength, direction, time of flight, or phase difference.

In some cases, the UE 110 uses information relating to signal strength to determine its location. For example, the UE 110 can measure the intensity of RF transmissions received from the wireless communication nodes 120. Because signal strength decreases as the distance from the source increases, this measurement can be used to estimate the UE's proximity to each wireless communication node 120. If the signal from a particular wireless communication node 120 is stronger, it suggests that the UE 110 is closer to that wireless communication node 120. By collecting signal strength data from multiple wireless communication node 120, the UE 110 can use that information to determine its position within the designated coverage area.

In some cases, the UE 110 utilizes information about the direction of incoming signals to ascertain its location. This can involve technologies like beamforming or the use of directional antennas that detect the angle from which signals are received. By determining the direction from which each signal arrives, the UE 110 can deduce its relative position to multiple wireless communication node 120, aiding in the refinement of its location within the designated coverage area, particularly useful in environments where signals may be obstructed or deflected.

In some cases, the UE 110 calculates its distance from a wireless communication node 120 based on the time of flight of RF signals. This can include measuring the time it takes for a signal to travel from a wireless communication node 120 to the UE, using the known speed of light to convert this time into distance. When the UE 110 receives time of flight data from several wireless communication node 120, it can employ multilateration techniques to determine its location by finding the point where these distances intersect.

In some cases, the UE 110 determines its location by analyzing the phase difference of the received RF signals. This approach can include measuring the phase shift that occurs as signals travel from a wireless communication node 120 to the UE. By comparing the received phase with the phase at the time of signal transmission, the UE 110 can estimate the distance traveled by the signal, which, when combined with similar data from other wireless communication node 120, enhances the accuracy of location determination. Such a technique can be beneficial in areas where direct signal paths are disrupted, allowing the UE 110 to effectively navigate complex signal environments.

In some cases, the identification of the location of the UE 110 is further based on, or alternatively based on, the environmental sensor data. For example, the UE 110 can be equipped with an environmental sensor 122 that can measure parameters such as barometric pressure, temperature, humidity, light, sound levels, air quality, or electromagnetic field (EMF) strength. Utilizing this environmental data, the UE 110 can enhance its location determination by comparing its sensor readings with data from similar sensors in nearby wireless communication nodes 120. If, for instance, the environmental conditions detected by the UE 110 match closely with those recorded by a specific node's sensors—like matching humidity levels or barometric pressures within a predefined threshold—this congruence can validate and reinforce the accuracy of the calculated position. Conversely, significant discrepancies in environmental data between the UE 110 and the wireless communication node might indicate an error in the initial location estimate, prompting the UE 110 to adjust its calculation or to utilize additional data inputs.

In some cases, wireless communication nodes 120 are configured to emit RF signals at multiple distinct power levels and/or frequencies. For instance, a wireless communication node 120 might transmit signals at a first power level of −30 dBm and a second, higher power level of 0 dBm, or at varying frequencies like 2.4 GHz and 5 GHz. The use of varied power levels and/or frequencies can allow the UE 110 to receive signals under different conditions and analyze how these signals behave as they travel through the environment.

Utilizing these different power levels and/or frequencies, the UE 110 can determine its location, for example by analyzing how the signals degrade or alter as they travel. Higher power levels might demonstrate effective penetration through dense materials or long distances, while lower power levels can be beneficial for reducing interference in crowded signal environments. The differing frequencies can assist in managing issues such as fading and multipath interference from environmental reflections. By analyzing signals received at these varied settings, the UE 110 can more accurately determine its position within the designated coverage area.

In some cases, the UE 110 employs a combination of techniques to determine and verify its location within the designated coverage area. For example, by utilizing signal strength, direction, time of flight, phase difference, and/or environmental sensor data, the UE 110 can analyze the conditions and characteristics of the received signals. Such a multifaceted approach can allow the UE 110 to adapt its location determination strategies based on the most reliable and relevant data available. For instance, it might weigh signal strength more heavily in open areas while relying more on phase difference or direction in structurally complex environments.

In some cases, the UE 110 can be configured to continuously run a Hidden Markov Model (HMM) to process and smooth data received from wireless communication nodes or Wi-Fi signals over time. Such a statistical model can help in managing the transitions between different states of signal reception, effectively reducing location flapping-a scenario where the indicated location of the UE 110 fluctuates erratically due to variations in signal quality or interference. By applying a Hidden Markov Model, the UE 110 can predict the most probable location state transitions based on the sequence of observed signal data.

In some cases, the UE 110 can utilize a trained machine learning model to improve the accuracy of its location determination. A trained model can be configured to process inputs such as any combination of signal strength, direction, time of flight, phase difference, environmental sensor data, or historical movement patterns of the UE 110 within the designated coverage area.

In some cases, the trained model can produce a probability distribution of potential locations for the UE, quantifying the likelihood of the UE 110 being at various points within the designated coverage area. This output can allow for a nuanced assessment of the most probable position of the UE 110 based on current and/or historical data. In some cases, the trained model can identify and disregard improbable location readings, such as those suggesting movement through physical barriers or abrupt changes across large distances. For example, if the UE 110 consistently registers data indicating it is on a specific floor of a building and suddenly an outlier data point suggests it has moved to a different floor or passed through a wall, the trained model can assess this as highly unlikely and assign a low probability to such a location.

The trained model may be adaptive, incorporating new data over time to refine its predictive accuracy. This continuous learning process can be valuable in dynamic environments where physical conditions and signal characteristics may evolve, such as in areas undergoing construction or where temporary obstructions are introduced. By adjusting its parameters in response to new environmental and signal data, the trained model can allow the UE 110 to maintain reliable location determination abilities.

The resolution of the determined location by the UE 110 can vary in precision and specificity depending on the configuration and requirements of the designated coverage area. For instance, in some scenarios, the identified location may simply indicate the room or area where the UE 110 is expected to be, or the wireless communication node 120 that the UE 110 is nearest to. In some cases, the location might be defined by precise coordinates within a specific room or a more granular area, providing a higher resolution of the UE's position.

At block 408, the UE 110 can determine whether there is a change in its location and, if so, whether that movement is significant enough to warrant an update to the CPS 130. In some cases, the UE 110 can determine the change by assessing its current location and comparing it to a previously recorded location. For example, an update might be deemed necessary if it is determined that the UE 110 has moved more than X meters within Y seconds, suggesting a transition from one predefined area to another, or that the UE 110 has moved from one room to another or across different building levels.

In some cases, the UE 110 can identify and flag unexpected movements and/or statistically impossible movements that do not align with typical movement patterns, such as the UE 110 appearing to move through physical barriers or covering an unusually large distance in a brief period. This may be achieved using the Hidden Markov Model or other computational model. In some cases, the UE 110 can be configured to trigger updates to the CPS 130 only when the UE 110 crosses predefined thresholds, such as entering or exiting designated zones or exceeding specific movement parameters.

At block 410, the UE 110 transmits an indication of its location to the CPS 130.

In some cases, the UE 110 transmits an indication of its location to the CPS 130 by including specifics such as "3rd floor, Room 318," rather than a comprehensive set of location data. Such a focused approach to transmitting location updates can conserve LTE data and reduce network load by sending only minimal information to convey the location. Alternatively, in some cases, the UE may transmit more complete location data, which could include, but is not limited to, detailed coordinates or extended data about the surrounding environment.

In some cases, the UE transmits the indication by activating a wireless transceiver 112, which can send the data via LTE, Wi-Fi, or other available wireless communication methods. As mentioned, the transmission can be triggered once the UE determines that a significant location change has occurred and should be communicated to the CPS 130 to maintain an accurate and up-to-date database of locations for all UEs 110 within the location determination system 100. This data exchange can allow the CPS 130 to track the movement of UEs 110 across the designated coverage area effectively, updating its records to reflect the most recent positions.

In some cases, a UE 110 can store more frequent data of its location than it passes to the CPS 130 since not all location data is automatically sent from the UE 110 to the CPS 130 in normal operation. This additional data may be uploaded to the CPS, for instance, once the UE has been placed into a charging unit at the end of a shift. While charging, the UE 110 may upload the additional location data to the CPS 130 where it may be stored for later analysis.

It will be understood that fewer, more, or different blocks can be used as part of the routine 400 of FIG. 4. For example, in some cases, if the UE 110 is unable to determine its location using the techniques described herein, the UE 110 may activate its GPS to ascertain its position. This scenario may arise when the UE finds itself outside the effective range of the indoor positioning signals or when the indoor signals are insufficiently reliable due to environmental factors. Once the GPS is activated and a location is successfully determined, the UE 110 can send this information to the CPS 130, ensuring that location tracking remains continuous and accurate. Conversely, if the UE can determine its location using the disclosed techniques without relying on GPS, the UE 110 can deactivate or keep the GPS turned off to conserve battery life. This selective use of GPS based on the necessity for accurate data helps optimize power consumption while maintaining precise location tracking capabilities.

Figure 5:
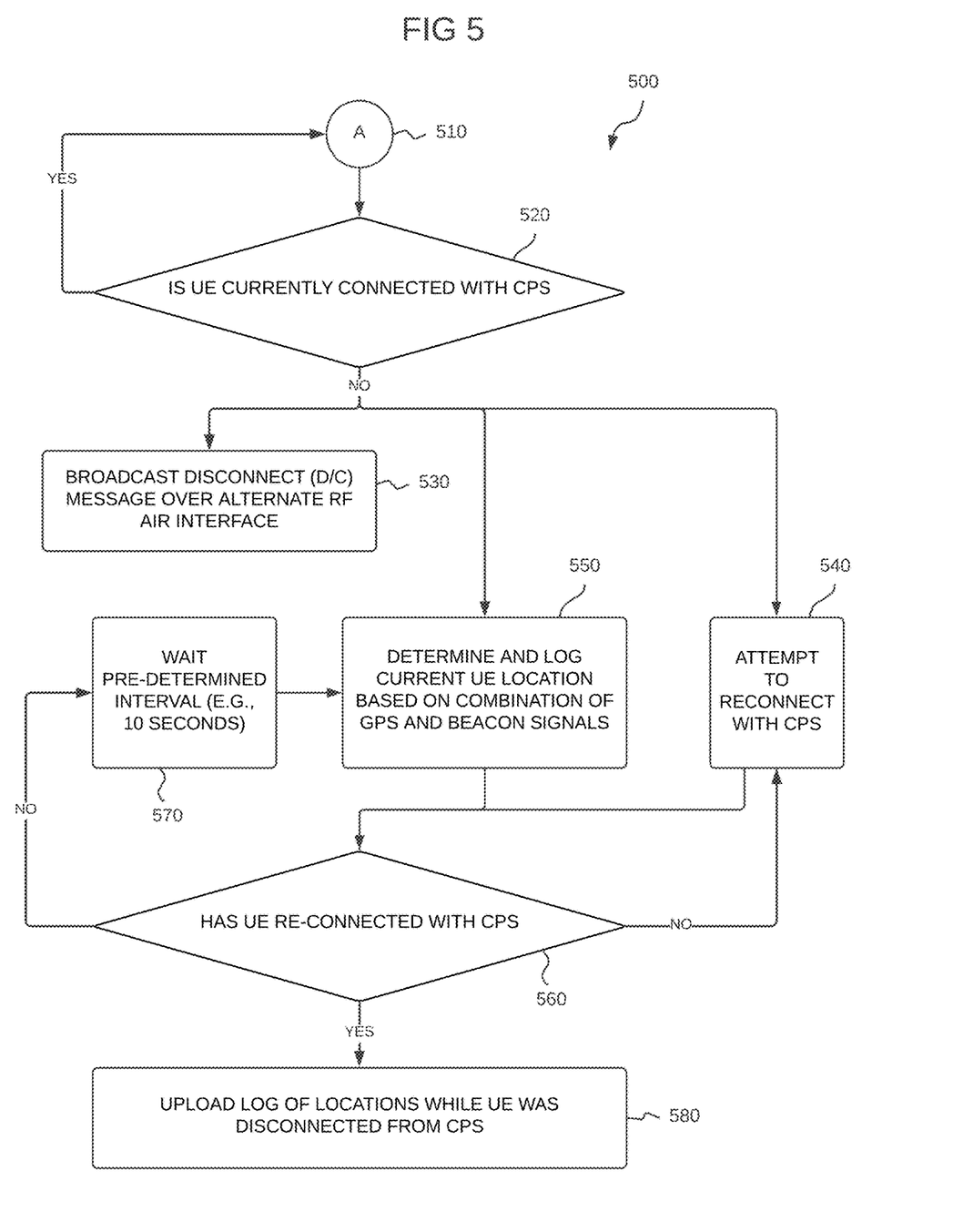
FIG. 5 presents another flow diagram illustrating an embodiment of routine, implemented by a UE, located within a designated coverage area.

FIG. 5 presents a flow diagram illustrating an embodiment of routine 500, implemented by a UE 110 and utilized by CPS 130, within a designated coverage area. The diagram outlines the process by which the UE 110 determines its own location by interacting with collection of wireless communication nodes 120 deployed throughout the designated coverage area and uses such information when it is disconnected from the CPS 130. Although described as being implemented by the UE 110, it will be understood that one or more elements outlined for routine 500 can be implemented by one or more computing devices/components that are associated with the location determination system 100, such as the CPS 130 or other network systems involved in managing and distributing environmental layout data. Thus, the following illustrative embodiment should not be construed as limiting.

FIG. 5 may start with a connection status indicator 510 on UE 110. At decision block 520, the UE 110 may determine whether it is currently connected with the CPS 130. A connection between a UE 110 and the CPS 130 means that messages (including data) between the two entities may be exchanged over a link of one or more wired networks interfaced with one or more wireless networks. When such messages can be readily exchanged in real-time, the UE 110 may be characterized as connected with the CPS 130. When messages cannot be exchanged in real-time for whatever reason, the UE 110 may be characterized as disconnected from the CPS 130. For instance, any outbound message that returns a failure response is indicative of UE 110 being disconnected from CPS 130. A UE 110 may be disconnected from the CPS 130 for a variety of reasons but one of the most common reasons is the UE 110 is out of range of a wireless network access point or in an area of insufficient or poor cellular service. It should be noted that severe degradation of message exchanges below acceptable quality of service (QoS) thresholds may also be characterized as the UE 110 being disconnected from the CPS 130.

If the UE 110 is currently connected with the CPS 130 as determined in decision block 520, the UE 110 will remain operational as is and periodically check the status of its connection with CPS 130. If the UE 110 is determined to be disconnected from the CPS 130 as determined in decision block 520, it will initiate a series of steps. These steps may be carried out in simultaneous separate processes. For instance, the UE 110 may broadcast a disconnect (D/C) message over an alternate RF air interface in block 530 in hopes of establishing a connection with another UE that can act as a proxy to relay messages to and from the CPS 130.

In block 540, the UE 110 will continually attempt to re-establish a connection with the CPS 130.

In block 550, the UE may begin to determine and log its own location. This may be achieved by scanning for signals from nearby BLE beacons 121. Any beacons 121 detected may be compared to the environmental layout data of beacons to determine the exact identity and location of the beacon(s) 121 detected by the UE 110. In conjunction with beacon location determination, the UE may determine its GPS position based an internal GPS module. Once UE 110 has self-determined its location, UE 110 can store or log the location information with a time stamp—also in block 550.

In response to attempts to re-establish a connection with the CPS in block 540, the UE 110 will determine if in fact it has re-established a connection with the CPS 130 in decision block 560. If UE 110 has not yet re-established a connection with the CPS 130, UE 110 will wait a predetermined interval in block 570 before repeating the location self-determination and storing process in block 550 above. The location self-determination and storing process continues to repeat at the specified interval until UE 110 has re-established a connection with the CPS 130.

Upon re-establishment of a connection with the CPS 130, the UE 110 may upload, in block 580, all of the self-determined location data it gathered while it was disconnected from the CPS 130. This self-determined location data may then be used by the CPS 130 to determine areas of poor wireless connectivity.

It will be understood that fewer, more, or different blocks can be used as part of the routine 500 of FIG. 5. For example, in some cases, if the UE 110 is unable to determine its location using the techniques described herein, the UE 110 may activate its GPS to ascertain its position. This scenario may arise when the UE finds itself outside the effective range of the indoor positioning signals or when the indoor signals are insufficiently reliable due to environmental factors. Once the GPS is activated and a location is successfully determined, the UE 110 can store this information to the CPS 130, ensuring that location tracking remains continuous and accurate. It may be uploaded to the CPS 130 upon re-establishment of a connection with the CPS 130. Conversely, if the UE can determine its location using the disclosed techniques without relying on GPS, the UE 110 can deactivate or keep the GPS turned off to conserve battery life. This selective use of GPS based on the necessity for accurate data helps optimize power consumption while maintaining precise location tracking capabilities.

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may include, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially"

as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. In a system comprised of a remote communication platform server (CPS), a plurality of fixed location wireless beacons within a geofenced area, and a fleet of user equipments (UEs) wherein each UE is (i) capable of wireless communication with the CPS over one or more of a plurality of wireless RF networks, and (ii) is configured to receive RF transmissions directly from the plurality of fixed location wireless beacons, a method for determining areas of poor wireless connectivity within the geofenced area, the method comprising:

for each UE in use within the geofenced area, determining whether the UE has an active connection with the CPS via at least one of the plurality of wireless RF networks and when the UE does not have an active connection with the CPS via any of the wireless RF networks:
self-determining its location within the geofenced area based on transmissions received directly from the plurality of fixed location wireless beacons;
storing its self-determined location;
repeating the location self-determining and location storing steps on a periodic basis until the UE has re-established an active connection with the CPS; and
upon re-establishment of an active connection with the CPS, uploading the stored self-determined location data to the CPS.

2. The method of claim 1 further comprising storing environmental layout data for the plurality of wireless beacons, wherein the environmental layout data comprises information that uniquely identifies each wireless beacon and associates each wireless beacon with its location within the geofenced area.

3. The method of claim 2, wherein self-determining the location of the UE comprises inputting the plurality of wireless beacon RF transmission signal strengths into a computational model that analyzes factors to probabilistically determine a nearest wireless beacon to the UE, with an output of the computational model being an indication of an identity of the nearest wireless beacon or a respective location of the nearest wireless beacon.

4. The method of claim 3, wherein the factors comprise the environmental layout data and signal strength data corresponding to the plurality of wireless beacon RF transmissions.

5. The method of claim 4, wherein the computational model is a Hidden Markov Model (HMM).

6. The method of claim 1, wherein the wireless beacons employ Bluetooth Low Energy (BLE) technology for signal transmission.

7. The method of claim 1, wherein the CPS analyzes the uploaded stored self-determined location data from each UE to determine areas within the geofenced area that exhibit poor wireless connectivity.

8. The method of claim 1, wherein the periodic basis is every ten seconds.

9. A system for determining areas of poor wireless connectivity within a geofenced area, the system comprising:
a remote communication platform server (CPS);
a plurality of fixed location wireless beacons within the geofenced area; and
a fleet of user equipments (UEs) wherein each UE is (i) capable of wireless communication with the CPS over one or more of a plurality of wireless RF networks, and (ii) is configured to receive RF transmissions directly from the plurality of fixed location wireless beacons,
wherein for each UE in use within the geofenced area, determining by the UE whether the UE has an active connection with the CPS via at least one of the plurality of wireless RF networks and when the UE does not have an active connection with the CPS via any of the wireless RF networks the UE is configured to:
self-determine its location within the geofenced area based on transmissions received directly from the plurality of fixed location wireless beacons;
store its self-determined location;
repeat the location self-determining and location storing steps on a periodic basis until the UE has re-established an active connection with the CPS; and
upon re-establishment of an active connection with the CPS, upload the stored self-determined location data to the CPS.

10. The system of claim 9 further comprising storing environmental layout data for the plurality of wireless beacons, wherein the environmental layout data comprises information that uniquely identifies each wireless beacon and associates each wireless beacon with its location within the geofenced area.

11. The system of claim 10, wherein self-determining the location of the UE comprises inputting the plurality of wireless beacon RF transmission signal strengths into a computational model that analyzes factors to probabilistically determine a nearest wireless beacon to the UE, with an output of the computational model being an indication of an identity of the nearest wireless beacon or a respective location of the nearest wireless beacon.

12. The system of claim 11, wherein the factors comprise the environmental layout data and signal strength data corresponding to the plurality of wireless beacon RF transmissions.

13. The system of claim 12, wherein the computational model is a Hidden Markov Model (HMM).

14. The system of claim 9, wherein the wireless beacons employ Bluetooth Low Energy (BLE) technology for signal transmission.

15. The system of claim 9, wherein the CPS analyzes the uploaded stored self-determined location data from each UE to determine areas within the geofenced area that exhibit poor wireless connectivity.

16. The system of claim 9, wherein the periodic basis is every ten seconds.

17. One or more non-transitory computer-readable mediums comprising program code executable by one or more processors to cause the one or more processors to determining areas of poor wireless connectivity within the geofenced area in a system comprised of a remote communication platform server (CPS), a plurality of fixed location wireless beacons within a geofenced area, and a fleet of user equipments (UEs) wherein each UE is (i) capable of wireless communication with the CPS over one or more of a plurality of wireless RF networks, and (ii) is configured to receive RF transmissions directly from the plurality of fixed location wireless beacons, the program code configured to:

for each UE in use within the geofenced area, determining whether the UE has an active connection with the CPS via at least one of the plurality of wireless RF networks and when the UE does not have an active connection with the CPS via any of the wireless RF networks:
self-determining its location within the geofenced area based on transmissions received directly from the plurality of fixed location wireless beacons;
storing its self-determined location;
repeating the location self-determining and location storing steps on a periodic basis until the UE has re-established an active connection with the CPS; and upon re-establishment of an active connection with the CPS, uploading the stored self-determined location data to the CPS.

18. The non-transitory computer-readable medium of claim 17, the one or more non-transitory computer-readable mediums comprising program code executable by one or more processors to cause the one or more processors to store environmental layout data for the plurality of wireless beacons, wherein the environmental layout data comprises information that uniquely identifies each wireless beacon and associates each wireless beacon with its location within the geofenced area.

19. The non-transitory computer-readable medium of claim 18, wherein self-determining the location of the UE comprises the program code executable by one or more processors to cause the one or more processors to input the plurality of wireless beacon RF transmission signal strengths into a computational model that analyzes factors to probabilistically determine a nearest wireless beacon to the UE, with an output of the computational model being an indication of an identity of the nearest wireless beacon or a respective location of the nearest wireless beacon.

20. The non-transitory computer-readable medium of claim 19, wherein the factors comprise the environmental layout data and signal strength data corresponding to the plurality of wireless beacon RF transmissions.

21. The non-transitory computer-readable medium of claim 20, wherein the computational model is a Hidden Markov Model (HMM).

22. The non-transitory computer-readable medium of claim 17, wherein the wireless beacons employ Bluetooth Low Energy (BLE) technology for signal transmission.

23. The non-transitory computer-readable medium of claim 17, wherein the CPS analyzes the uploaded stored self-determined location data from each UE to determine areas within the geofenced area that exhibit poor wireless connectivity.

24. The non-transitory computer-readable medium of claim 17, wherein the periodic basis is every ten seconds.

* * * * *